United States Patent [19]
Crowley

[11] Patent Number: 5,216,834
[45] Date of Patent: Jun. 8, 1993

[54] SOLAR STRUCTURE

[76] Inventor: Lawrence J. Crowley, 314 Duncans Rd., Werribee, Victoria 3030, Australia

[21] Appl. No.: 777,532
[22] PCT Filed: Jun. 13, 1990
[86] PCT No.: PCT/AU90/00258
§ 371 Date: Dec. 9, 1991
§ 102(e) Date: Dec. 9, 1991
[87] PCT Pub. No.: WO90/15523
PCT Pub. Date: Dec. 27, 1990

[30] Foreign Application Priority Data
Jun. 22, 1989 [AU] Australia .............................. 4863/89

[51] Int. Cl.⁵ .............................................. E04D 1/12
[52] U.S. Cl. .......................................... 47/17; 160/41; 52/63
[58] Field of Search .................... 47/17; 52/171, 63; 160/41

[56] References Cited
U.S. PATENT DOCUMENTS
3,741,631  6/1973 Laing ..................... 47/17
4,672,202 12/1986 Esposito ................ 47/17

FOREIGN PATENT DOCUMENTS
79405/87 12/1988 Australia .
0031884  7/1981 European Pat. Off. .
2223158 11/1972 Fed. Rep. of Germany ......... 47/17
3035232  9/1980 Fed. Rep. of Germany .
3120907 12/1982 Fed. Rep. of Germany ......... 47/17
3105441  4/1983 Fed. Rep. of Germany .
3217804 11/1983 Fed. Rep. of Germany .

Primary Examiner—Henry E. Raduazo
Attorney, Agent, or Firm—Larson and Taylor

[57] ABSTRACT

A solar structure, and more particularly a greenhouse, comprising a framework formed from frame members (20, 20a) and a flexible cover (26) having portions (28) of varying optical density along its length, and wound between a pair of opposed spooled 24 mounted on respective sides of the framework such that the cover is wound from one spool to the opposed spool. The cover is constrained to move over rollers (22) extending longitudinally of the framework, and the edges of the cover are received to move within slots formed in the edges of the frame members.

12 Claims, 3 Drawing Sheets

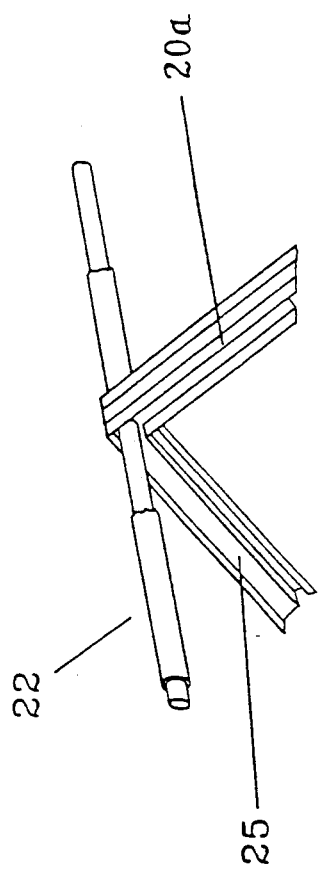
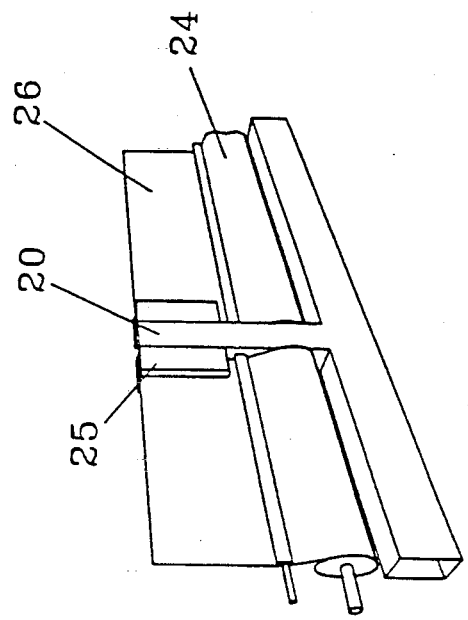
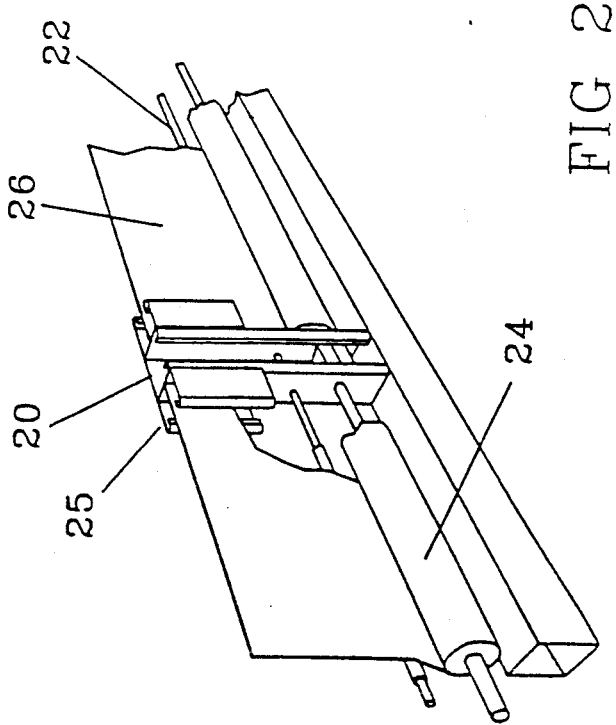
FIG. 4
FIG. 3
FIG. 2

SOLAR STRUCTURE

TECHNICAL FIELD

The present invention relates to a dynamic membrane to regulate solar radiation and thus aid the environmental control of structures such as greenhouses, swimming pools, patios, atriums and the like. A greenhouse is used as the example in this description.

BACKGROUND ART

Greenhouses are used to provide a sheltered, controlled environment for plant growth. Thus, most preferably, a greenhouse should foster plant life within it by giving shelter, by controlling the reception of solar radiation, by providing controlled ventilation and by reducing nocturnal re-radiation.

It has been found in practice that all these aforementioned characteristics are difficult to achieve in concert in known greenhouse structures which have a fixed canopy or glazing; this is because the reception of required solar radiation by day is not compatible with the need to conserve warmth by night.

Currently, in warm weather, gardeners whitewash or mount shade cloth to the structure to reduce sunlight and cause vents to open or close to exhaust or trap air. In large greenhouse structures, fans are used for ventilation and electro-mechanical rigid sliding roof panels have been proposed. In cold periods warmth is achieved by heating, and insulating materials may be added at night to prevent heat escape. These procedures are imprecise, laborious and may consume excessive energy.

It is an object of the present invention to alleviate, at least in part, these aforementioned disadvantages.

DISCLOSURE OF THE INVENTION

According to the present invention there is provided a solar structure comprising a framework defining a space there within, a flexible cover having a varying optical density along its length and forming a roof and at least part of a side wall for the structure, said cover being adapted to be moved within said framework such that a selected portion of the cover overlies the space, and said cover solely forming the roof and said part of the side wall of the structure.

Preferably the cover is wound between a pair of opposed spools mounted on respective sides of the framework, whereby the cover is wound from one spool to the opposed spool.

With the present invention, and in the case where the solar structure forms a greenhouse overlying a cultivating space, the internal environment of the greenhouse may be maintained or varied according to the optical density of the framework cover selected to overlie the cultivating space. Thus, a particular choice of canopy length may be wound between the spools to form the canopy to match the particular ambient weather conditions. For example, clear plastic may be the choice in dull conditions and shade cloth, e.g. 50% shade cloth, in bright sunlight or a combination of both may be selected where the materials are juxtapositioned along the cover, whilst an insulating material may be used to close up the greenhouse to conserve energy and contain heat at night, and to give protection during severe storms. These selections may be manual, motorized or automatic, the automated processes being optionally controlled by a small computer programme and suitable sensors.

The ends of the greenhouse may be open or closed. When closed, a door may be incorporated into one or both of the ends to permit entry to the cultivating space and the closed ends may be transparent, translucent or opaque, or a combination of these.

Preferably, the cover spools are disposed at the bottom of the respective sides of the framework and the cover forms the sole canopy of the greenhouse. Alternatively, the cover may form only a partial greenhouse canopy. For example, the bottom portion of the framework on one or both sides may not be covered by the framework cover, with the opposed spools being remote from the bottom of the framework. Such a portion or portions may be covered by glazing or other structure, for example, which may overcome problems with undulations in the ground at the bottom of the framework or where the structure is connected to another structure such as a house wall.

The framework cover may comprise a plurality of lengths of material, having different optical densities arranged sequentially along its length. Each length is contiguous with adjacent lengths and advantageously is capable of extending substantially fully from one spool to the opposed spool. One or more of the lengths of materials particularly an opaque length, may be heat insulating and/or heat reflective. One or more of the lengths of materials may be foraminous, such as in the form of shade cloth, with several foraminous lengths advantageously having holes of different size or different number to provide regions of varying optical density and/or ventilation. Each length of material may take any suitable form, for example woven, or otherwise be formed as a continuous sheet and may be formed from any suitable flexible materials such as polyethylene or PVC. The flexible material may be suitably treated to possess a desired optical density for example by applying a coating or forming openings therethrough. The flexible cover may be formed from a single length of material suitably having a different optical density along its length.

The framework is conveniently gable shaped, alternatively, the framework may adopt any other appropriate cross-section such as a triangular, rectangular, arched or bowed.

If the framework is longer than the optimum width of the framework cover, additional opposed spools and respective covers may be employed along the framework. In such circumstances, cover lengths of different optical densities may overly the cultivating space along the length of the framework at any one time and may set up temperature gradients and/or different conditions at different portions of the cultivating space as desired. This may be advantageous when different plants having various requirements of temperature and sunlight are grown in the same greenhouse.

BRIEF DESCRIPTION OF THE DRAWINGS

A preferred embodiment of the invention, in the form of a greenhouse, will now be described with reference to the accompanying drawings in which:

FIG. 2 is an enlarged view partly sectioned of circled region A of FIG. 1,

FIG. 3 is an enlarged view partly sectioned of circled region B of FIG. 1,

FIG. 4 is an enlarged view of the circled region C of FIG. 1, and

BEST MODE FOR CARRYING OUT THE INVENTION

Figure 1:
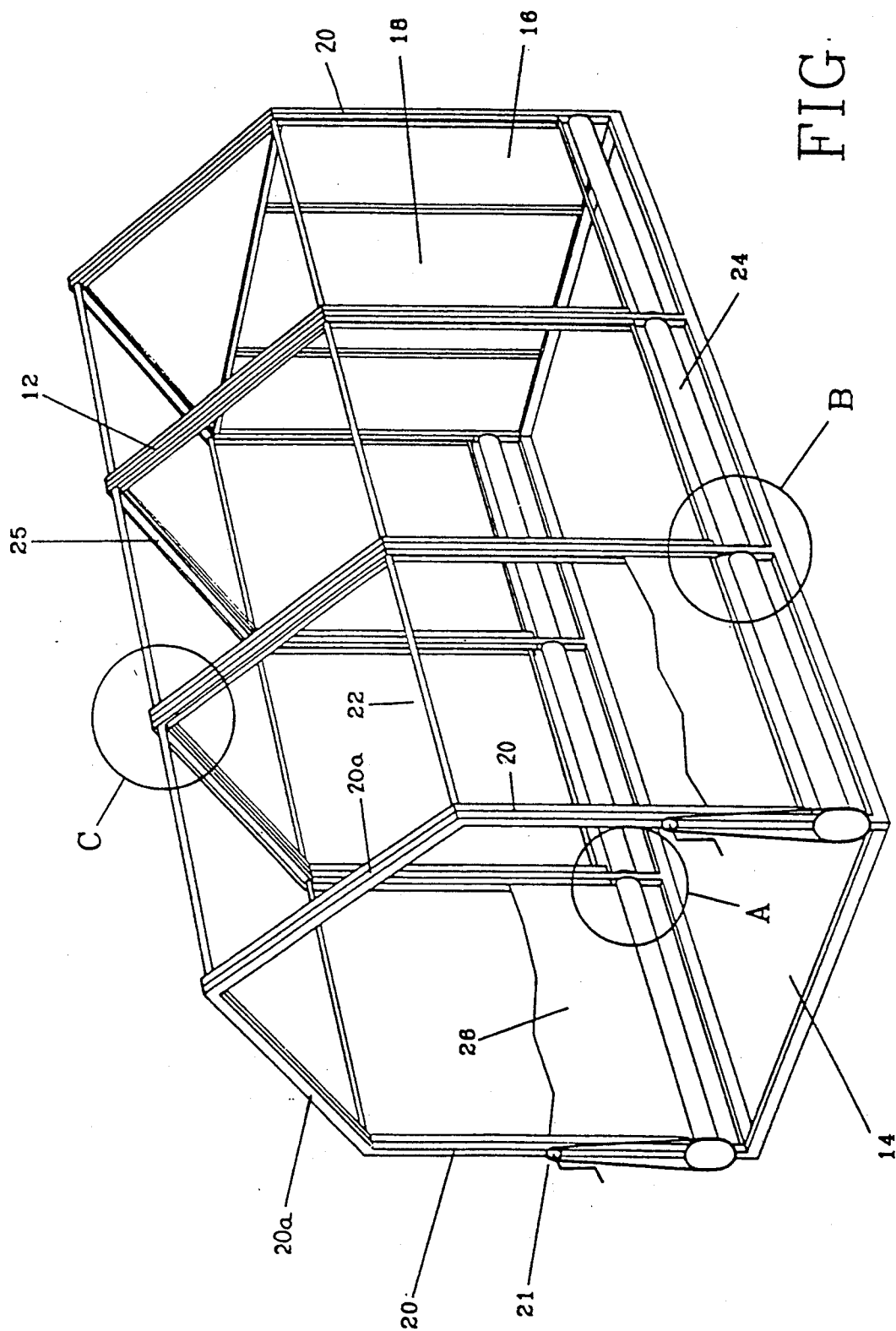
FIG. 1 is a perspective view of the greenhouse.

As shown in FIG. 1, the greenhouse comprises a framework 12 the roof forming part of which is of a gable like shape. The respective ends 14 and 16 of the framework are filled in with glass or plastic which is preferably transparent and double glazed. The end 16 has a door 18 formed therein, to permit access to the cultivating space defined within the framework 12.

The framework 12 may be set on the ground, or on a prepared surface such as a concrete slab or on rails such that the structure can be mobile. The framework 12 consists of a plurality of spaced upright members 20 terminating at the ends of gable forming members 20a, four of which are shown in FIG. 1. The upright members 20 and the gable forming members 20a are interconnected by five sets of cross members 22 disposed respectively at the top, shoulder and bottom of both sides of the members and extending longitudinally of the framework to give structural integrity to the framework. Each cross member 22 comprises a series of rollers, with a single roller extending between adjacent frame members 20, with the axis of rotation of the rollers 22 in each series being in alignment. A spool 24 is mounted for rotation at the base of respective upright members 20 and, as shown in FIG. 2, a series of aligned spools 24 are supported for rotation, by the upright members 20.

Each spool 24 has wound thereon a flexible framework cover 26 having varying optical density along its length. The flexible cover passes from a spool 24 on one side of the framework 12 and over the framework to an opposed spool on the opposite side of the framework 12 as will be hereinafter described.

Figure 5:
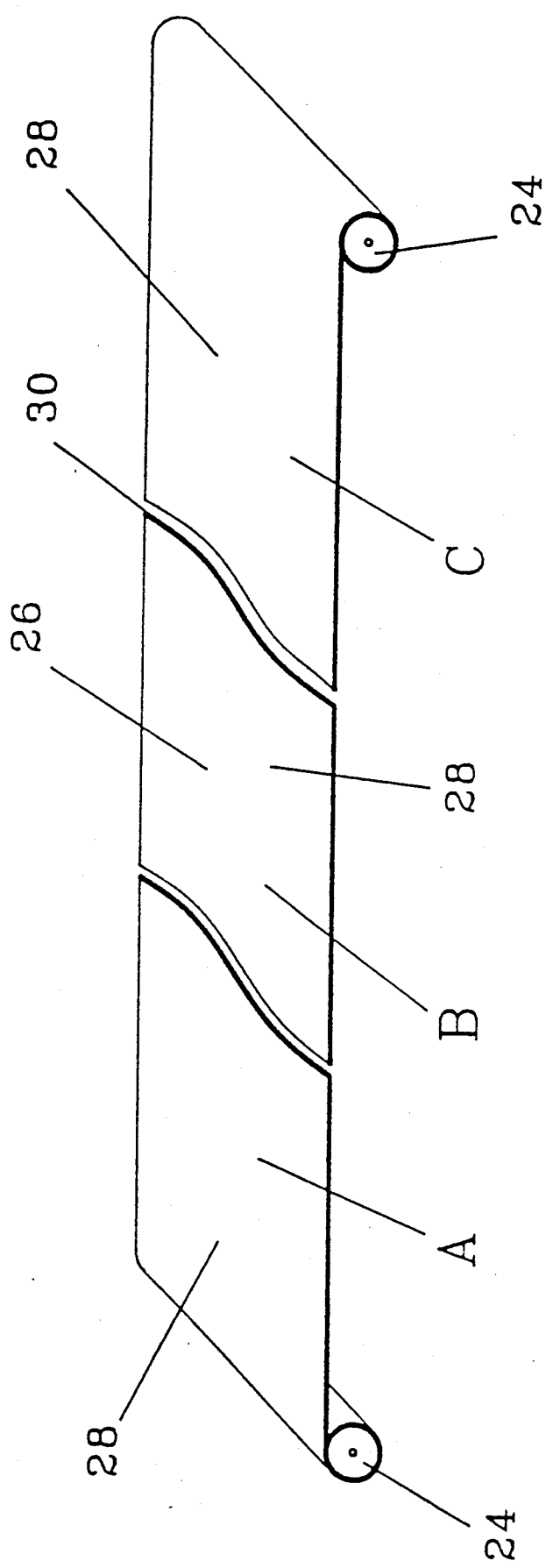
FIG. 5 is a schematic view showing the cover wound between opposed spools removed from the framework. Lengths of materials of different optical density are shown as discrete panels.

FIG. 5 shows the cover 26 wound between opposed spools 24 but with the framework 12 removed for purposes of clarity only. The panels A, B and C represent adjacent lengths of material 28 having differing optical densities. Each length of material 28 is of sufficient length to span the framework 12 with the lengths A, B, and C being shown shortened for convenience. The lengths 28 are arranged sequentially along the cover 26 and are selected from transparent, translucent and opaque lengths. Some of the lengths may have heat insulating and/or heat reflective properties and some of the lengths may be foraminous to provide shade and ventilation. As shown in FIG. 5 the longitudinal ends 30 of adjacent lengths 28 are joined by a seam which may be stitched or welded.

The end positions of the framework cover are fixed to opposed spools 24 using any convenient fixing arrangement, such as keying in to a slot in each spool 24.

The framework cover 26 feeds from each spool 24 under the adjacent bottom cross member roller 22 which, together with the spools 24, are actually mounted for rotation between adjacent upright members 20 on the same side of the framework, the position of the mounting being within the base of each member 20. The axes of rotation of the cross member rollers 22 are parallel with the axes of rotation of the spools 24.

After passing under the bottom cross member roller 22, the edges of the cover 26 pass into guide means in the form of continuous slots 25 formed respectively in the adjacent sides of the upright and gable members 20 and 20a.

The edges of each side of the cover 26 are slidable along the slots 25 of adjacent members 20 as the cover 26 is wound between the opposed spools, and, at the same time, the cover is maintained in a substantially taut condition within the framework by the slots 25 and by the cross member rollers 22. The cover may be wound between the opposed spools to select a particular length 28 of material according to existing environmental conditions. For example, on very hot sunny days a partially transparent foraminous material such as a shade cloth may span the framework, creating shade and venting hot air to atmosphere. In cold conditions, the shade cloth may be wound from the framework 12 onto one of the spools, and clear material wound across the framework 12 such that it spans the framework to cover the cultivating area so as to allow a maximum amount of radiation to enter the cultivating space. In warm conditions a combination of clear and foraminous material may span the framework 12 regulating the amount of radiation which can enter the enclosed area. In order to retain absorbed heat within the cultivating space, for example at night, an opaque insulating length may be wound from one of the spools to cover the framework. In cool conditions of low angle sun a combination of clear and insulating material may span the framework where the radiation enters the space through the clear material some striking the cultivation area and some reflected back onto the cultivation area from the reflective inner surface of the insulating material. Such insulating lengths may, for example comprise metal coated plastics.

The spools 24 may be rotated by motorised drive means (not shown) comprising, for example an electric motor, combustion engine or the like connected via a drive transmission to one or more of the spools 24 thereby causing rotation in a desired sense of direction. Alternatively, a handle may be disposed at one or both ends of a spool 24 thereby permitting spool rotation. In the embodiment shown in FIG. 1, a rotatable handle 21 may be positioned on both sides and either end of the framework 12 and in turn each carry a pulley forming part of a pulley drive 21a to the respective spools 24. Thus the aligned spools 24 may share a common drive shaft so that rotation of one of the spools causes each of the spools 24 along one side of the framework 12 to rotate, followed by the spools 24 on the other side of the framework 12, pulled by the cover 26 through the slots 25 over the horizontal rollers 22.

Sensing devices may be associated with the greenhouse to sense environment changes. Such sensing devices may be linked to a microprocessor which activates winding of the spools 24 to cause materials 28 of a desired type to span the framework. The sensing device(s) may include a thermostat or light meter, which may be mounted for example in the greenhouse interior.

Those skilled in the art will appreciate that the invention described herein is susceptible to variations and modifications other than those specifically described. It is to be understood that the invention includes all such variations and modifications which fall within its spirit and scope.

I claim:

1. A solar structure comprising:

a framework defining a space therewithin, a flexible cover having a varying optical density along its length and forming at least part of a roof for the structure, said cover being adapted to be moved within said framework such that a selected portion of the cover overlies the space, and said cover solely forming the said at least part of the roof of the structure.

2. A solar structure as claimed in claim 1, wherein the cover is wound between a pair of opposed spools mounted on respective sides of the framework, whereby the cover is wound from one spool to the opposed spool.

3. A solar structure as defined in claim 2, wherein the flexible cover is also disposed over horizontal rollers extending along said framework.

4. A solar structure as defined in claim 1, wherein the framework is slotted and the edges of the flexible cover are disposed within said slots.

5. A solar structure as defined in claim 1, wherein the cover comprises materials with selected transparency and degrees of translucence and having insulating, reflecting and foraminous qualities, each of which materials may cover the internal space at any one time.

6. A solar structure as defined in claim 1, wherein a combination of juxtapositioned materials may cove& the internal space at any one time.

7. A solar structure according to claim 1, wherein the flexible cover also forms at least part of a sidewall for the structure, said cover solely forming the said part of the sidewall as well as the said at least part of said roof of the structure.

8. A solar structure as claimed in claim 7, wherein the cover is wound between a pair of opposed spools mounted on respective sides of the framework, whereby the cover is wound from one spool to the opposed spool.

9. A solar structure as defined in claim 8, wherein the flexible cover is also disposed over horizontal rollers extending along said framework.

10. A solar structure as defined in claim 7, wherein the framework is slotted and the edges of the flexible cover are disposed within said slots.

11. A solar structure as defined in claim 7, wherein the cover comprises materials with selected transparency and degrees of translucence and having insulating, reflecting and foraminous qualities, each of which materials may cover the internal space at any one time.

12. A solar structure as defined in claim 7, wherein a combination of juxtapositioned materials may cover the internal space at any one time.

* * * * *